(12) United States Patent
Behling et al.

(10) Patent No.: US 10,981,488 B2
(45) Date of Patent: Apr. 20, 2021

(54) VEHICLE FOR LIFTING, TRANSPORTING, AND LOWERING LOAD CARRIERS

(71) Applicant: Fraunhofer-Gesellschaft zur Foerderung der angewandten Forschung e.V., Munich (DE)

(72) Inventors: Jan Behling, Dortmund (DE); Mathias Rotgeri, Dortmund (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/743,158

(22) Filed: Jan. 15, 2020

(65) Prior Publication Data

US 2020/0238884 A1    Jul. 30, 2020

(30) Foreign Application Priority Data

Jan. 25, 2019 (DE) .................... 10 2019 101 857.9

(51) Int. Cl.
| | |
|---|---|
| *B60P 1/48* | (2006.01) |
| *B60P 1/44* | (2006.01) |
| *B60P 3/00* | (2006.01) |
| *B60P 1/02* | (2006.01) |

(52) U.S. Cl.
CPC .............. *B60P 1/483* (2013.01); *B60P 1/027* (2013.01); *B60P 1/4421* (2013.01); *B60P 3/00* (2013.01)

(58) Field of Classification Search
CPC ..... B60P 1/4421; B60P 1/07522; B60P 1/025; B60P 1/027; B60P 1/483; B60P 3/00
See application file for complete search history.

(56) References Cited

U.S. PATENT DOCUMENTS 3,240,506 A * 3/1966 McMullen .............. B60P 1/027
                                                    280/43.23
3,288,315 A * 11/1966 Bigden .................. B60P 1/025
                                                    414/476

(Continued)

FOREIGN PATENT DOCUMENTS

| DE | 11 27 728 B | 4/1962 |
|---|---|---|
| DE | 11 71 760 B | 6/1964 |

(Continued)

OTHER PUBLICATIONS

German Office Action in DE 10 2019 101 857.9, dated Sep. 4, 2019, with English translation of relevant parts.

*Primary Examiner* — Kaitlin S Joerger
(74) *Attorney, Agent, or Firm* — Collard & Roe, P.C.

(57) ABSTRACT

A vehicle has at least two axles, each having at least one wheel for lifting, transporting, and lowering load carriers. A first axle is mounted in a chassis. Lifting elements are provided for lifting and lowering the load carriers. The distance of the second axle relative to the first axle can be changed in the horizontal longitudinal vehicle direction, and the lifting elements are lifted or lowered by a change in the distance of the second axle from the first axle. The at least one wheel of the first axle can be driven by a drive motor that is arranged on the chassis, and at least one lifting element is displaced horizontally inward or outward by the change in the distance of the second axle from the first axle in the transverse vehicle direction.

16 Claims, 6 Drawing Sheets

(56) References Cited

U.S. PATENT DOCUMENTS

| | | | | |
|---|---|---|---|---|
| 4,008,902 A | * | 2/1977 | Dill | B60P 1/025 |
| | | | | 280/43.23 |
| 4,122,963 A | | 10/1978 | Berglund et al. | |
| 6,019,565 A | * | 2/2000 | Gesuale | B60P 1/025 |
| | | | | 254/10 R |
| 7,736,115 B2 | * | 6/2010 | Lambert | B60P 1/027 |
| | | | | 414/474 |
| 9,669,874 B2 | * | 6/2017 | Schmidt | B62D 21/14 |
| 9,975,463 B2 | * | 5/2018 | Weldy | B60G 17/027 |
| 10,144,587 B2 | * | 12/2018 | Stubbs | B66F 9/07522 |
| 2003/0067136 A1 | * | 4/2003 | Scott | B60P 1/027 |
| | | | | 280/124.157 |
| 2007/0253801 A1 | * | 11/2007 | Van Weezel | B60P 1/025 |
| | | | | 414/495 |
| 2012/0032492 A1 | * | 2/2012 | Garibotti | B60P 1/027 |
| | | | | 298/17.5 |
| 2018/0297501 A1 | * | 10/2018 | Studer | B62D 21/20 |
| 2018/0319238 A1 | * | 11/2018 | Denton, III | B60G 17/04 |
| 2019/0343701 A1 | * | 11/2019 | Dirauf | B66F 9/063 |

FOREIGN PATENT DOCUMENTS

| | | | | |
|---|---|---|---|---|
| DE | 12 69 901 B | | 6/1968 | |
| DE | 27 08 251 A1 | | 9/1977 | |
| DE | 35 23 566 A1 | | 1/1986 | |
| DE | 10162227 A1 | * | 11/2005 | B60P 1/027 |
| FR | 2 724 884 A1 | | 3/1996 | |
| FR | 2724884 A1 | * | 3/1996 | B62D 21/12 |
| FR | 2801014 B1 | * | 8/2003 | B60P 1/34 |
| FR | 2978434 A1 | * | 2/2013 | B60P 1/027 |
| FR | 2987794 A1 | * | 9/2013 | B60P 1/027 |
| GB | 262 560 A | | 12/1926 | |
| WO | WO-2005018985 A1 | * | 3/2005 | B60P 1/025 |

* cited by examiner

VEHICLE FOR LIFTING, TRANSPORTING, AND LOWERING LOAD CARRIERS

CROSS REFERENCE TO RELATED APPLICATIONS

Applicant claims priority under 35 U.S.C. § 119 of German Application No. 10 2019 101 857.9 filed Jan. 25, 2019, the disclosure of which is incorporated by reference.

BACKGROUND OF THE INVENTION

1. Field of the Invention

The invention relates to a vehicle having at least two axles, each having at least one wheel, for lifting, transporting, and lowering load carriers, wherein a first axle is mounted in a chassis, wherein lifting elements are provided for lifting and lowering the load carriers, wherein the distance of the second axle relative to the first axle can be changed in the horizontal longitudinal vehicle direction, and wherein the lifting elements are lifted or lowered using the change in the distance of the second axle from the first axle. Within the scope of the invention, the term load carrier is also to be understood as a single object to be transported.

2. Description of the Related Art

Vehicles for transport of load carriers are used, above all, in the sector of logistics, in many different ways. In this regard, automatic driverless transport vehicles are preferably used. Transfer, i.e. pickup and discharge of the respective load carrier onto or from the vehicle depends, in the case of the previous vehicles, on the configuration of the transfer stations (conveying technology, workstations), i.e. these vehicles are designed for the respective interaction with the respective conveying technology or with the respective workstation.

Frequently, however, the need exists to lift loads or load carriers up from a floor surface or ground surface before transport or to set them down onto a floor surface or ground surface after transport. For this purpose, vehicles in the manner of a forklift are generally known, which require an additional lifting device aside from the actual travel drive. These vehicles are therefore complicated and expensive.

A vehicle having at least two axles, each having at least one wheel, for lifting and lowering load carriers, is known from GB 262 560 A; it is configured as a horse trailer for transporting a haystack. The trailer has two axles, each having a wheel, wherein the axles are mounted in a frame in the shape of a reverse V, which has two frame shanks connected with one another in pivoting manner in an upper pivot joint. Hook-shaped lifting elements are suspended on the upper pivot joint, which elements are lifted in the longitudinal vehicle direction by means of a reduction in the pivot angle between the two frame shanks, and thereby a reduction in the distance between the two axles. These hook-shaped lifting elements are affixed manually, at the side, on the underside of the haystack, before the haystack is lifted; subsequently, the two frame shanks are pivoted toward one another manually by a certain dimension, and this pivoting is correspondingly complicated and force-intensive. As a result, the hook-shaped lifting elements and thereby the haystack are lifted. This lifting process is supported by additional tines that are arranged on the frame shanks in fixed manner. In the raised position, the frame shanks must be manually secured in the pivoted-in transport position by means of an additional securing chain that runs horizontally. Operation of this trailer is therefore possible only manually and is very complicated, as three different elements (hook, tines, chain) are required.

SUMMARY OF THE INVENTION

It is therefore the task of the invention to make available a vehicle that allows pickup and discharge of load carriers from or onto a floor surface or ground surface with as little effort as possible.

This task is accomplished, in the case of a vehicle of the type indicated initially, according to the invention, in that at least one wheel of the first axle can be driven by a drive motor that is arranged on the chassis, and that at least one lifting element is displaced horizontally in a transverse vehicle direction, inward or outward, by means of the change in the distance of the second axle relative to the first axle.

According to the invention, a preferably automatic vehicle is thereby made available, which does not require any complicated additional lifting device, but rather, on the one hand, horizontal displacement of the second axle relative to the first axle, in the longitudinal vehicle direction, is converted into a vertical lifting movement. Thereby the vehicle has the ability of being able to pick up a load at defined load pickup points, to transport it, and to set it down. As a result, load pickup from the ground or a floor is possible with few actuators. In this regard, on the other hand, the at least one lifting element performs not only a lifting movement, but in addition a horizontal movement in a transverse vehicle direction, so as to move close to the load carrier from the side when picking up the load, and moving away from it at the side again when setting the load down, thereby guaranteeing secure, automatic pickup of the load carriers, even if a load is placed close to a wall.

In a preferred embodiment, it is provided, in this regard, that at least the second axle has two separate axle sections, each having a wheel. The vehicle can then be structured in such a manner that the lifting elements, viewed in the transverse vehicle direction, are arranged farther inward than the two separate axle sections, so that the vehicle can engage around the respective load carrier from the outside, so to speak, i.e. the load carrier is situated in the region between the two separate axle sections.

In this regard, it is provided, in a normal case, that at least one lifting element is arranged on each side.

For horizontal displacement of the second axle relative to the first axle, it can be provided, according to a first embodiment, that at least one horizontally acting setting drive is assigned to the second axle. This setting drive can be a separate drive, but it can also be coupled with the drive motor by way of suitable gear mechanisms.

Preferably, the wheels of the second axle alternatively are each provided with a locking device. When the locking device is active for the wheels of the second axle, the horizontal displacement of the second axle relative to the first axle can be brought about in that the wheels of the first axle are driven by the drive motor, either in the forward or in the reverse direction. As a result, horizontal displaceability of the second axle relative to the first axle is possible without an additional drive motor; only one drive motor is required for the entire vehicle.

In an embodiment that is particularly preferred, in terms of design, it is provided that the second axle is mounted in two support elements in the shape of a reverse V, which are spaced laterally apart from one another. Each support element has two support arms connected with one another at the upper ends, by way of a pivot joint, so as to pivot. The respective first support arm is connected with the chassis with its lower end, and the second axle is mounted in the lower ends of the two second support arms. At least one lifting element is arranged on the support element for lifting and lowering, which element can be lifted or lowered using a change in the pivot angle between the respective first and second support arm. To change the horizontal distance between the second axle and the first axle, in this regard the pivot angle between the respective support arms is changed. As a result, the lifting elements are lifted or lowered at the same time.

Preferably, it is provided that the respective pivot joint is provided with a locking device, in each instance. The locking devices, for example brakes, are then activated during travel and are released for lifting or lowering, i.e. for picking up or discharging the load carriers.

In a further preferred embodiment, a support crosspiece is attached to each support arm, in each instance, which crosspiece extends in the direction toward the other support arm of the same support element. A lifting element is connected with at least one support crosspiece.

In a first embodiment, it is provided, in this regard, that the support crosspieces each have a guide pin that runs essentially vertically at their free end, and that each lifting element has a guide recess, in each instance, at its two ends, wherein the guide pins of the support crosspieces of one side engage into the guide recesses of a lifting element.

In order to also allow a horizontal movement of the lifting elements in the case of embodiment described above, it is furthermore preferably provided that the guide recesses extend, at least in certain regions, both in the longitudinal vehicle direction and in the transverse vehicle direction.

In an alternative embodiment, the support crosspieces of one side overlap at their ends, and at least one support crosspiece end has a slanted region on the side facing the other support crosspiece end. The slanted region is preferably oriented so that the support crosspiece having the slanted region is moved both vertically and horizontally in the transverse vehicle direction in the case of a horizontal displacement in the longitudinal vehicle direction.

In a further embodiment, the vehicle can preferably have elements configured to telescope in the longitudinal vehicle direction. The elements configured to telescope can each be provided with a locking device.

In the case of an embodiment with support crosspieces, the elements configured to telescope can be formed by the support crosspieces.

In the case of the embodiment described above, it can furthermore be provided that the respective lifting element is suspended on the support elements assigned to it, and is articulated onto a support crosspiece so as to pivot.

Finally, it is preferably provided that at least one axle is configured as a steering axle.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF PREFERRED EMBODIMENTS

A vehicle 1 according to the invention serves for lifting, transporting, and lowering a load carrier 2, which is shown in box-like manner in the exemplary embodiments, but of course can also have a different shape (e.g. pallet shape). Within the scope of the invention, such a load carrier 2 should also be understood to be a single object to be transported; the box-like load carrier 2 shown itself serves to hold different objects, which are not shown.

The preferably self-driving, automatic vehicle 1 has two axles, namely a first axle 3 and a second axle, which is preferably formed by two separate axle sections 4, 5. A wheel 6 is arranged on the first axle 3, on both sides, in each instance; a wheel 7, 8 is also arranged on each axle section 4, 5 of the second axle, in each instance. Differing from what is shown schematically, one of the axles can be a steering axle; also, it is possible to provide only one wheel 6.

The first axle 3 is mounted in a chassis of the vehicle 1, referred to in general as 9, which is not shown in any greater detail. The wheels 6 of the first axle 3 can be driven by a drive motor, not shown, which is arranged on the chassis 9. The vehicle 1 furthermore has lifting elements for lifting and lowering the respective load carrier 2; these lifting elements will be described in greater detail below. In the following description, by analogy to the structure of a forklift, the first axle 3 is viewed as being the rear axle and the second axle is viewed as being the front axle.

The vehicle 1 has a longitudinal vehicle direction, indicated by a double arrow 10, and a transverse vehicle direction indicated by a double arrow 11.

It is essential for the structure of the vehicle 1 that the distance of the second axle (axle sections 4 and 5) relative to the first axle 3 can be changed in the horizontal longitudinal vehicle direction 10, and that the lifting elements are configured so that they can be lifted or lowered by means of a change in the distance of the second axle (axle sections 4 and 5) from the first axle 3.

For this purpose, in the case of the exemplary embodiment according to FIG. 1 to FIG. 4, the second axle (axle sections 4 and 5) is mounted in two support elements 12, 13 in the shape of a reverse V, which are spaced apart from one another laterally, wherein each support element 12, 13 has two support arms connected with one another by way of a pivot joint 14, 15, so as to pivot, at the upper ends, wherein the respective first support arm 16, 17 is articulated onto the chassis 9 with its lower end, so as to pivot, and the second axle, i.e. the respective axle sections 4, 5, are mounted in the lower ends of the two second support arms 18, 19. In each instance, at least one lifting element 20 is arranged on each support element 12, 13, for lifting and lowering the load carrier 2. This lifting element 20 is configured so that it can be lifted or lowered by means of changing the pivot angle between the respective first support arm 16, 17 and the respective second support arm 18, 19.

For this purpose, in the case of the exemplary embodiment according to FIG. 1 to FIG. 4, a support crosspiece 21, 22 is fastened onto each support arm 16, 17, 18, 19, in each instance, which crosspiece extends in the direction toward the other support arm of the same support element 12, 13. The support crosspieces of the two support arms 17 and 19 are not shown, but are arranged accordingly. In the case of this embodiment, the respective lifting element 20 is connected with the two support crosspieces 21, 22 in the manner that will be described in greater detail below. The support elements 12 and 13 can be connected with one another, as shown, in the region of the pivot joints 14 and 15, by means of a rod-shaped connection element 23. This connection element 23, however, can also be eliminated.

Figure 5:
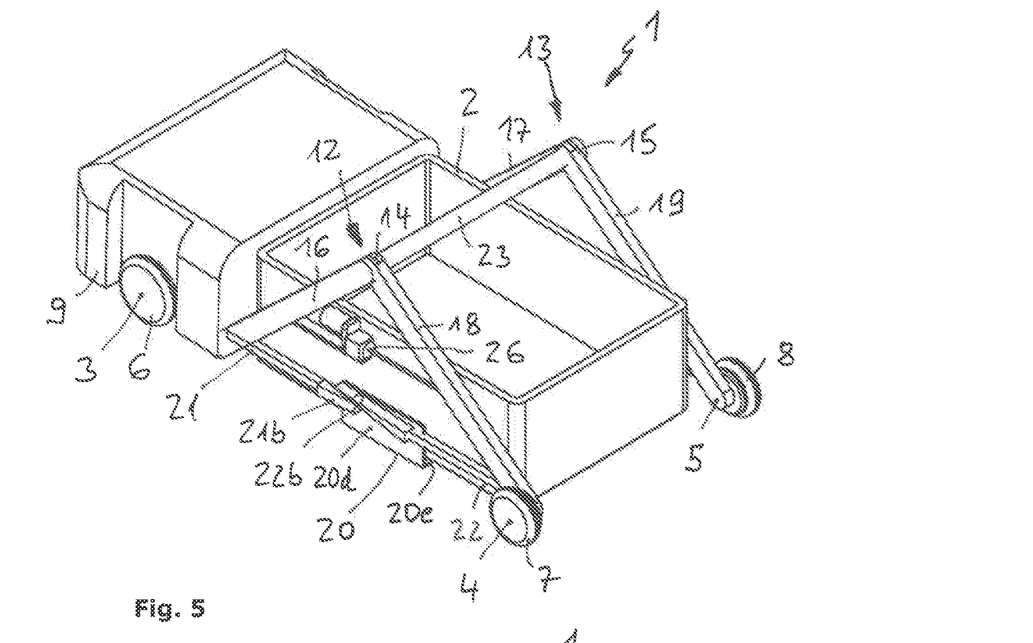
FIG. 5 shows in a schematic representation a vehicle according to a second embodiment, before picking up a load.

The support crosspieces 21 and 22 each have a guide pin 21a, 22a, which runs essentially vertically, at their free end. The lifting element 20 has a guide recess 20a, 20b, viewed in the longitudinal vehicle direction 10, at both ends, in each instance, wherein the guide pins 21a, 22a of the support crosspieces 21, 22 of one vehicle side engage into the guide recesses 20a, 20b of a lifting element 20. The guide recesses 20a, 20b of the lifting element 20 are configured in a horizontal region 20c of the lifting element 20. This horizontal region 20c makes a transition into a vertical crosspiece section 20d toward the vehicle interior. At the lower edge of the crosspiece section 20d, a horizontal holding section can follow, which is not evident and which serves for engaging under the underside of the load carrier 2. Such a horizontal holding section 20e is shown in FIG. 5, for example.

The guide recesses 20a and 20b preferably extend, in certain regions, at least both in the longitudinal vehicle direction 10 and also in the transverse vehicle direction 11. In the exemplary embodiment according to FIG. 1 and FIG. 2, a locking device 24, for example a brake, is assigned to each wheel 7, 8 of the second axle or the axle sections 4, 5; also, the pivot joints 14, 15 are provided with a locking device 25, in each instance.

Figure 1:
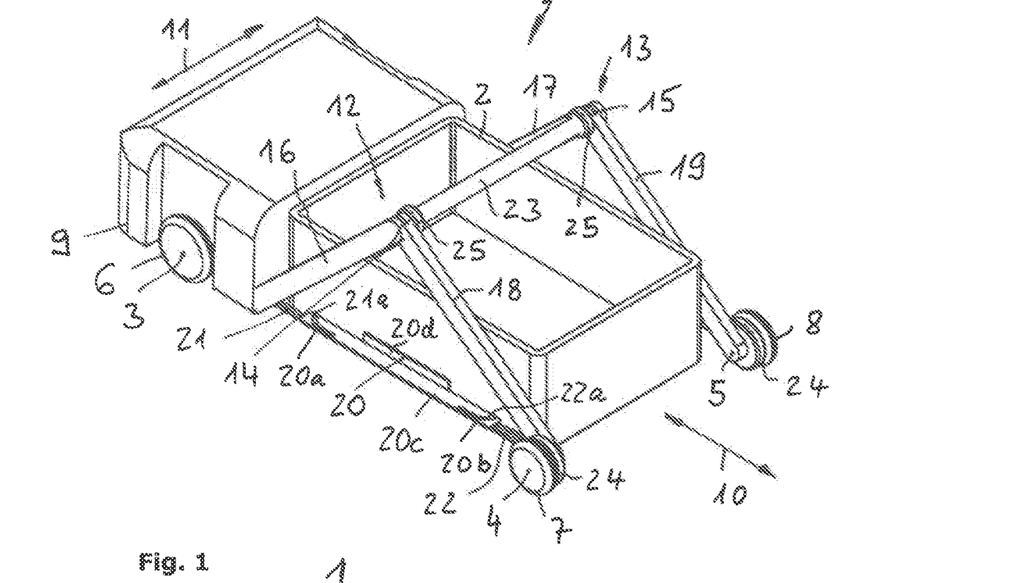
FIG. 1 shows in a schematic representation a vehicle according to a first embodiment, before picking up a load.
Figure 2:
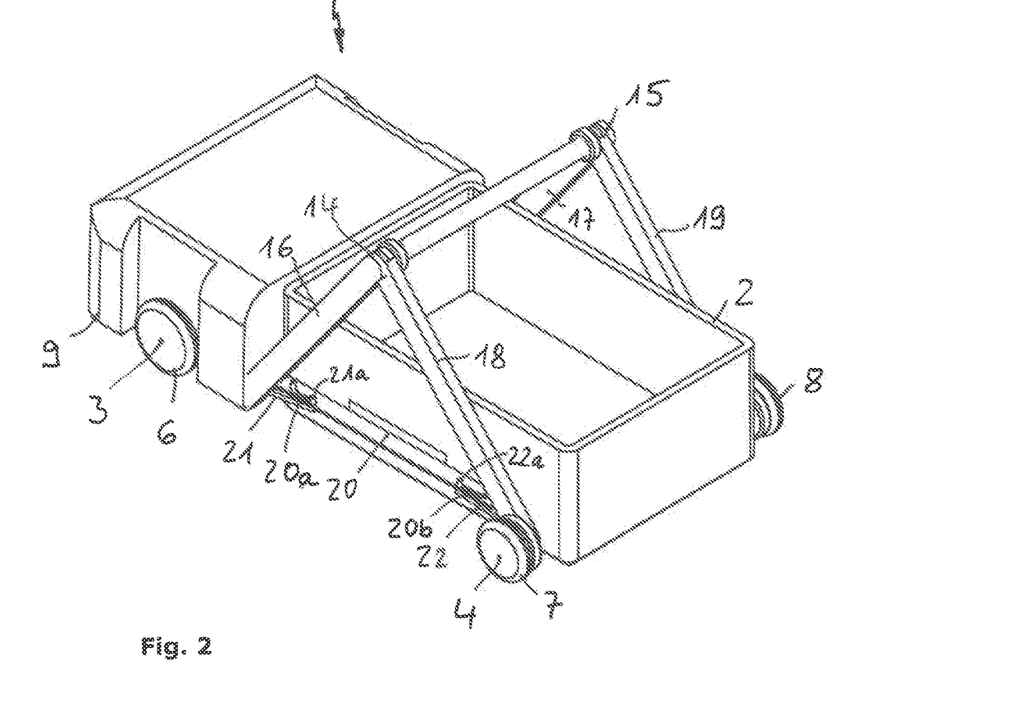
FIG. 2 shows in a schematic representation the vehicle according to FIG. 1, after picking up the load.

The method of operation of the vehicle 1 according to FIG. 1 and FIG. 2 is as follows:

When a load carrier 2 is situated on a floor surface or ground surface (FIG. 1), and is supposed to be lifted by the vehicle 1 and subsequently transported, the vehicle 1 moves into the position shown in FIG. 1, preferably in fully automatic manner, so that the load carrier 2 is situated in the interior of the vehicle 1, between the two support elements 12, 13. In this position, the lifting elements 20, viewed in the transverse vehicle direction 11, have moved so far outward that the vertical crosspiece sections 20d are still at a distance from the side edges of the load carrier 2. These vertical crosspiece sections 20d can also be configured as clamping jaws; then the aforementioned lower horizontal holding sections are not present. In this position, shown in FIG. 1, the guide pins 21a, 22a are situated in the guide recesses 20a, 20b, at the outermost (longitudinal) end, in each instance, and, viewed in the transverse vehicle direction 11, farthest inward.

The locking devices 25 of the pivot joints 14 and 15 are now released, so that the pivot joints 14 and 15 can rotate, and the locking devices 24 of the wheels 4 and 5 are activated, so that the wheels 4 and 5 cannot rotate. Subsequently, the drive motor is activated, and the wheels 6 of the first axle 3 rotate in the forward direction, so that the distance between the first axle 3 and the second axle, in other words the axle sections 4 and 5, is reduced in the horizontal longitudinal vehicle direction 10, and as this reduction happens, the support arms 16, 18 and 17, 19 pivot toward one another. As a result, the support crosspieces 21 and 22 move into the guide recesses 20a and 20b under compulsory guidance. Because the support crosspieces 21 and 22 are firmly connected with the assigned support arms 16, 18, the guide pins 21a and 22a resultingly lift up, and, caused by this lifting up, the lifting elements 20 do so as well. Furthermore, the respective vertical crosspiece section 20d of the lifting elements 20 is moved inward, viewed in the transverse vehicle direction 11, due to the configuration of the guide recesses 20a, 20b, so that on the one hand, the vertical crosspiece sections 20d lie against the edges of the load carrier 2, possibly with a clamping effect, and the horizontal holding sections 20e engage under the load carrier 2, and, on the other hand, the lifting elements 20 and thereby the load carrier 2 are lifted.

Subsequently, the locking devices 25 of the pivot joints 14, 15 are activated, and the locking devices 24 of the wheels 7 and 8 are released, so that the vehicle 1 can travel, with the load carrier 2 lifted.

To lower the load carrier 2, preferably at a different location, the locking devices 24 of the wheels 7 and 8 are activated again, the locking devices 25 of the pivot joints 14 and 15 are released, and the wheels 6 of the first axle 3 are driven in reverse by the drive motor, so that the vehicle 1 is back in the position shown in FIG. 1. As a result, the lifting elements 20 are lowered and moved outward, so that the load carrier 2 is released again.

Figure 3:
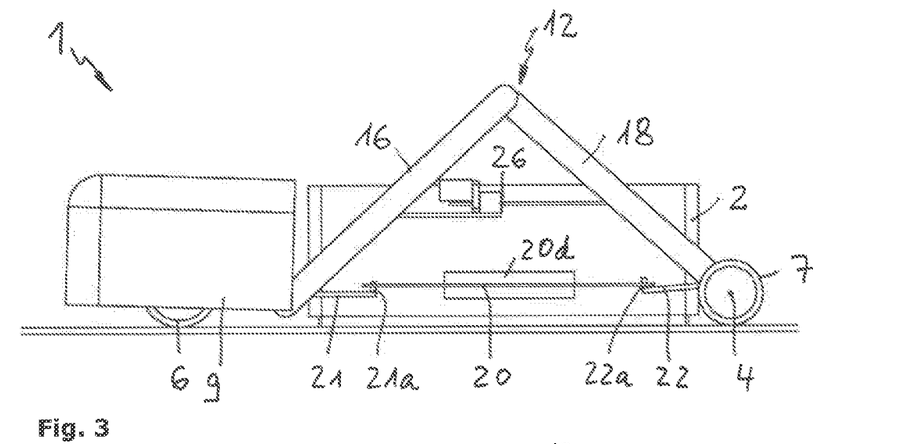
FIG. 3 shows a side view of FIG. 1 in a modified embodiment.
Figure 4:
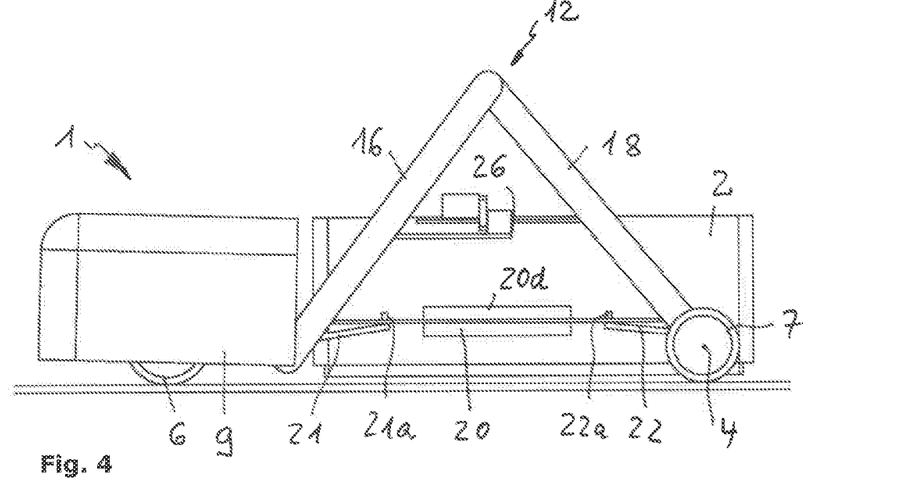
FIG. 4 shows a side view of FIG. 2 in a modified embodiment.

In FIG. 3 and FIG. 4, a modification of FIG. 1 and FIG. 2 is shown. In this regard, a horizontally acting setting drive 26 is provided between the respective first support arm 16, 17 and the respective second support arm 18, 19, in each instance, which drive is independent of the drive motor. In the case of this embodiment, the setting drive 26 serves to change the pivot angle between the first support arm 16, 17 and the second support arm 18, 19 between the transport position and the lifting and lowering position, in each instance. If such an additional setting drive 26 is provided, the locking devices 24 and 25 can be eliminated.

Figure 6:
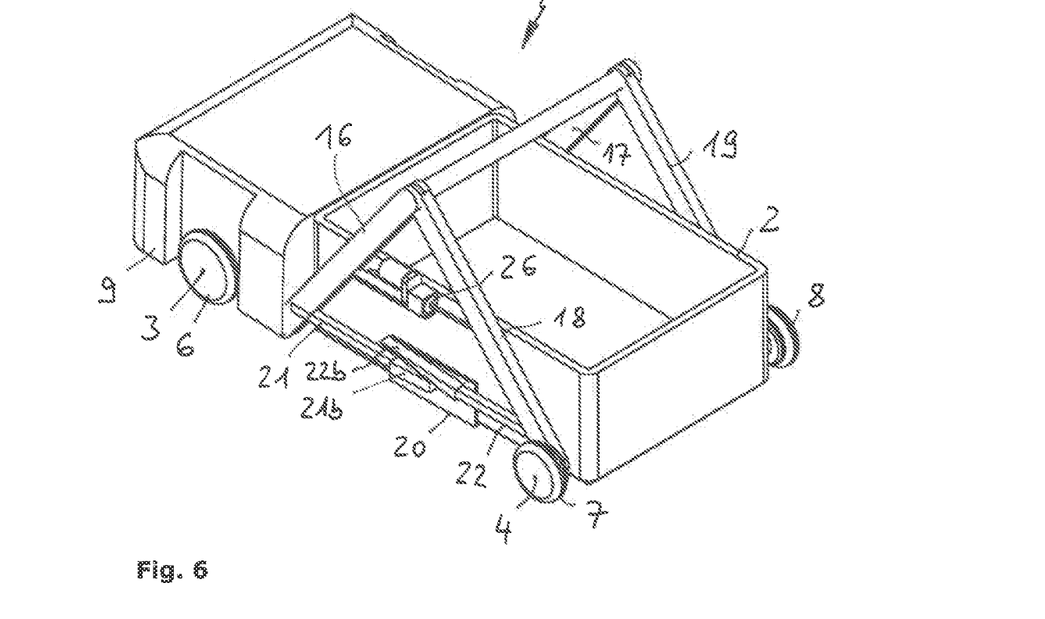
FIG. 6 shows in a schematic representation the vehicle according to FIG. 5, after picking up the load.

In FIG. 5 and FIG. 6, a second embodiment of a vehicle 1 according to the invention is shown. In this regard, if the same or similar parts are involved, the same reference symbols are used as in the preceding figures.

In the case of this vehicle 1, as well, two support elements 12, 13 in the shape of a reverse V are provided, having first support arms 16, 17 and second support arms 18, 19, which can be pivoted by way of pivot joints 14, 15, for example using a setting drive 26.

In the case of this embodiment, however, the lifting elements 20 and the support crosspieces 21, 22 are configured differently. The support crosspieces 21 and 22 are so long that the support crosspieces 21, 22 overlap on one side, at their ends, and at least one support crosspiece end, for example the support crosspiece end 22b of the support crosspiece 22, has a slanted region on the side facing the other support crosspiece end 21b.

In the case of the exemplary embodiment shown, in this regard the slanted region is configured on the underside of the support crosspiece end 22b; in this regard, the slanted region is oriented in such a manner that it leads to the result, if the distance of the second axle from the first axle 3 is reduced, that on the one hand, the support crosspiece end 22b is moved vertically upward on the support crosspiece end 21b, by means of displacement in the longitudinal vehicle direction 10, and on the other hand, moved inward viewed in the transverse vehicle direction 11.

As is shown, the support crosspiece end 21b can also have a slanted region on the top, which is complementary to the slanted region on the support crosspiece end 22b. In this regard, the respective lifting element 20 is fastened to the support crosspiece end 22b, so that it follows the movement of the support crosspiece end 21b as described above. In other words, on the one hand it can be lifted vertically, and on the other hand, it can be displaced inward in the transverse vehicle direction 11.

Otherwise, the functional sequence of this vehicle 1 does not differ in comparison with that according to FIG. 1 to FIG. 4.

It is apparent that instead of the setting drive 26, locking devices 24 and 25 can also be provided in the case of the embodiment according to FIG. 5 and FIG. 6.

In FIG. 7 to FIG. 12, a third embodiment of a vehicle 1 according to the invention is shown, wherein once again, the same reference symbols as in the preceding figures are used for the same or similar parts.

In the case of this embodiment, the vehicle 1 has elements configured to telescope, viewed in the longitudinal vehicle direction 10, which elements are formed by the support crosspieces 21, 22. When the distance between the second axle (axle sections 4 and 5) relative to the first axle 3 is changed, and thereby the pivot angle between the support arms 16 and 18 as well as 17 and 19 is changed, the support crosspiece 21 moves into the support crosspiece 22, more or less telescopically. Of course, a reverse configuration would also be possible.

In the case of this embodiment, the lifting elements 20 are suspended on the assigned support element 12, 13, specifically by way of a cable 27 or the like, which is articulated on in the region of the pivot joints 14, 15 with one end, and articulated onto the respective lifting element 20 with the other end, for example. Furthermore, the respective lifting element 20 is articulated onto a support crosspiece, for example onto the support crosspiece 21, by way of a pivot lever 28 indicated in FIG. 9 to FIG. 12, so as to pivot.

When the distance of the second axle (axle sections 4 and 5), in the longitudinal vehicle direction 10, relative to the first axle 3 is reduced, and the pivot angle between the support arms 16, 18 as well as 17, 19 is reduced, and thereby the pivot joints 14, 15 and the articulation points of the cables 27 essentially move vertically upward, the lifting elements 20 are lifted due to the configuration described above, and moved inward due to the pivoting articulation, by way of the pivot levers 28, on the support crosspiece 21, so as to make contact under the load carrier 2.

Figure 7:
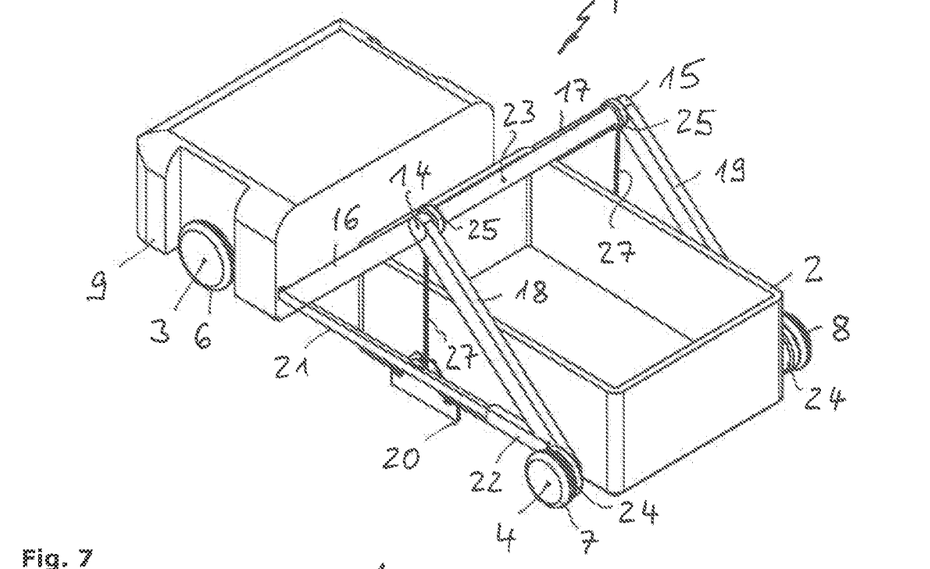
FIG. 7 shows in a schematic representation a vehicle according to a third embodiment, before picking up a load.
Figure 8:
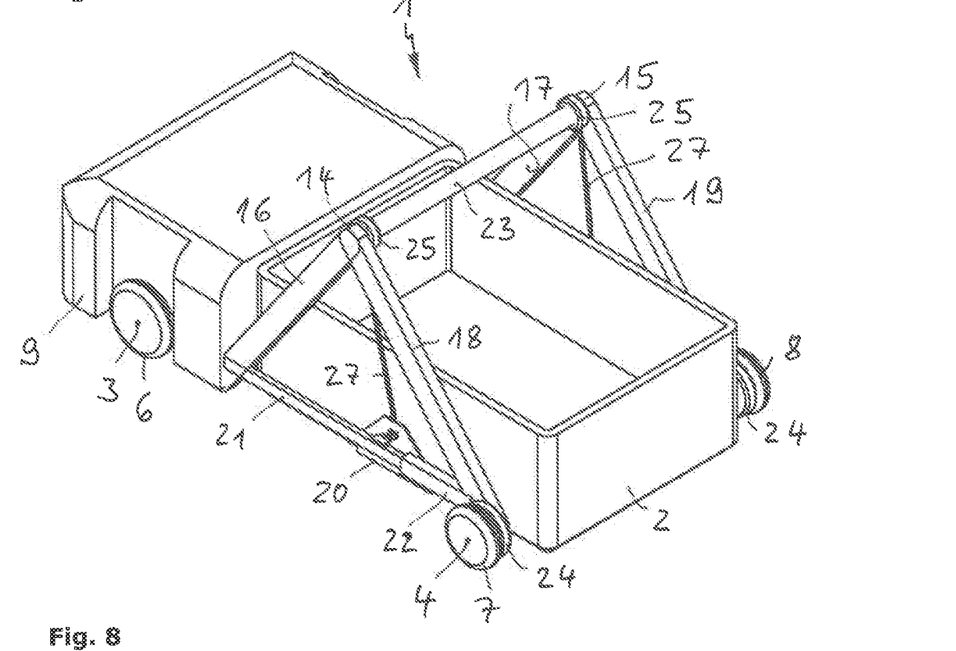
FIG. 8 shows in a schematic representation the vehicle according to FIG. 7, after picking up the load.
Figure 9:
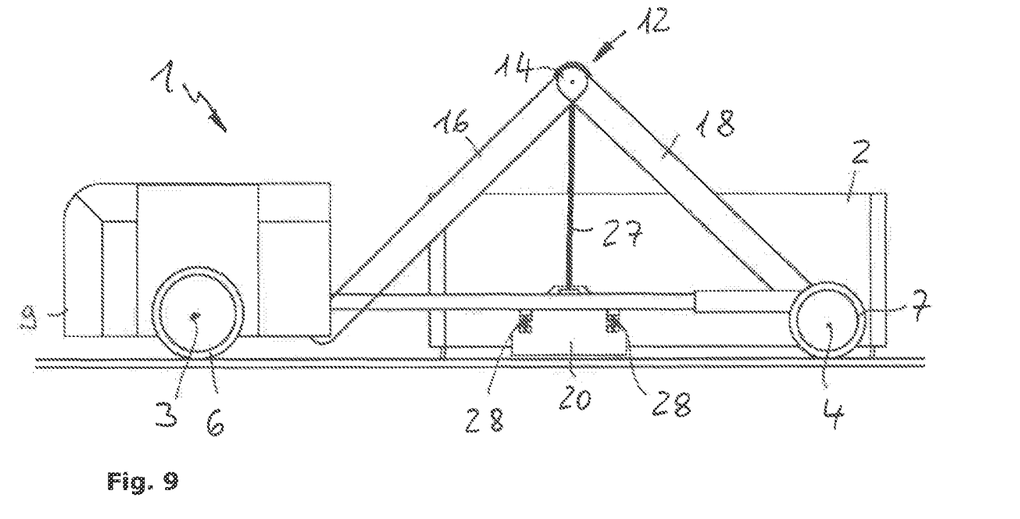
FIG. 9 shows a side view of FIG. 7.
Figure 10:
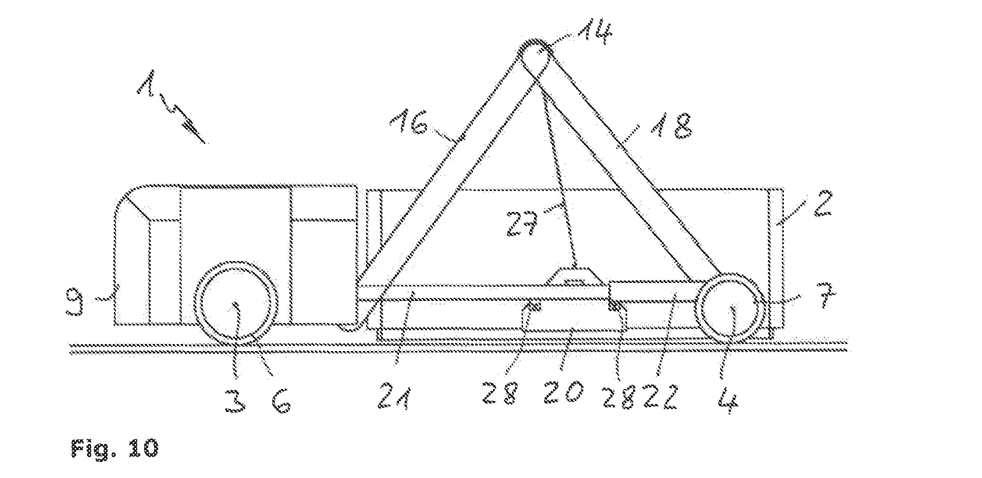
FIG. 10 shows a side view of FIG. 8.
Figure 11:
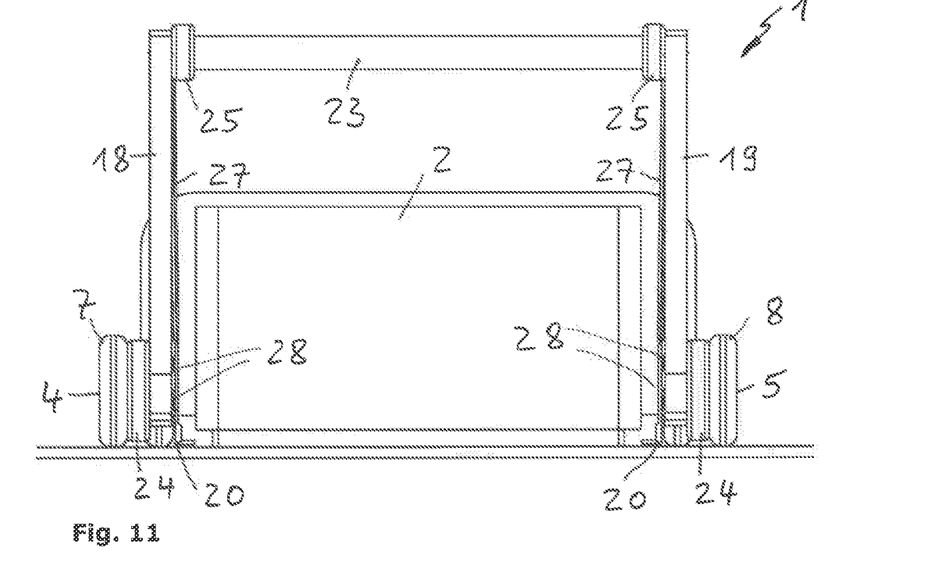
FIG. 11 shows a front view of FIG. 7.
Figure 12:
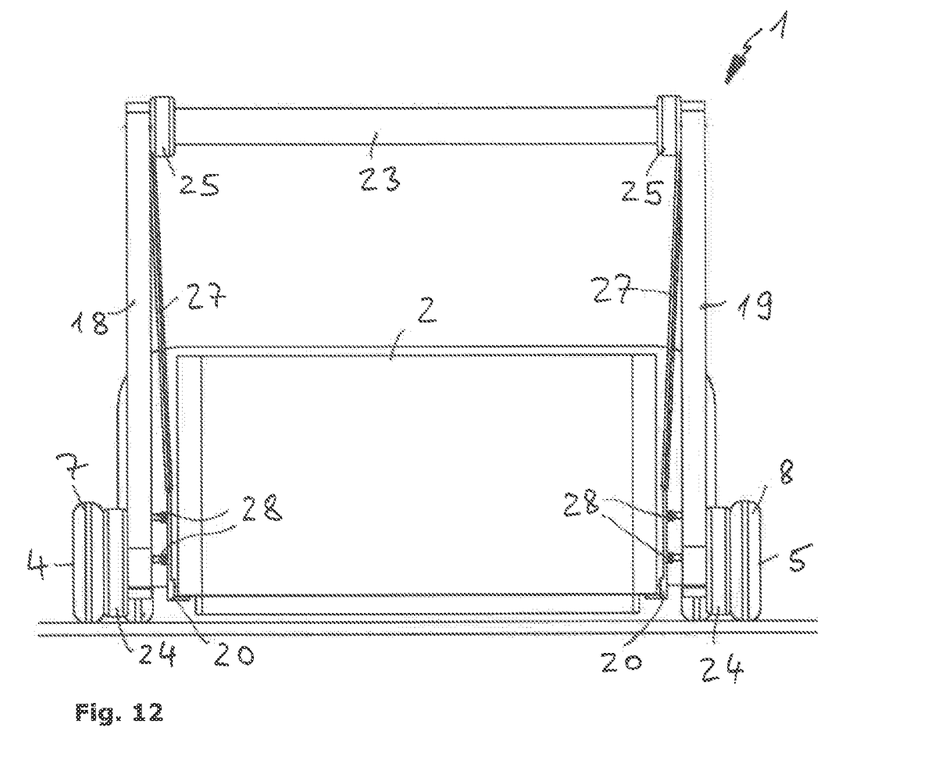
FIG. 12 shows a front view of FIG. 8.

Instead of the locking devices 24 and 25 shown in FIG. 7 and FIG. 12, setting drives 26 can also be provided, as in the case of the embodiment according to FIG. 5 and FIG. 6.

Of course, the invention is not restricted to the exemplary embodiments shown. Further embodiments are possible, without departing from the basic idea. For example, the horizontal adjustability of the second axle relative to the first axle 3 can also be structured differently; it is not necessary that support elements 12 in the form of a reverse V are provided; instead, elements that can telescope, viewed in the longitudinal vehicle direction, can also be provided, with a setting and locking device assigned to them. Of course, the vehicle 1 has actuators and sensors, if necessary, which are not shown.

Although only a few embodiments of the present invention have been shown and described, it is to be understood that many changes and modifications may be made thereunto without departing from the spirit and scope of the invention.

What is claimed is:

1. A vehicle for lifting, transporting, and lowering a load carrier comprising:
    (a) a chassis;
    (b) a first axle mounted in the chassis and having at least one wheel;
    (c) a second axle having at least one wheel;
    (d) lifting elements for lifting and lowering the load carrier;
    (e) a drive motor arranged on the chassis for driving the at least one wheel of the first axle;
    wherein a distance of the second axle relative to the first axle is changeable in a horizontal longitudinal vehicle direction;
    wherein a change of the distance causes lifting or lowering of the lifting elements; and
    wherein at least one lifting element is displaced horizontally in a transverse vehicle direction, inward or outward, by the change in the distance of the second axle relative to the first axle.

2. The vehicle according to claim 1, wherein at least the second axle has separate first and second axle sections, each axle having a respective wheel.

3. The vehicle according to claim 1, wherein at least one lifting element is provided on each side of the chassis.

4. The vehicle according to claim 1, further comprising at least one horizontally acting setting drive assigned to the second axle.

5. The vehicle according to claim 1, wherein each wheel of the second axle is provided with a respective locking device.

6. The vehicle according to claim 1,
    wherein the second axle is mounted in first and second support elements that are spaced apart laterally from one another and shaped to form a reverse V;
    wherein each support element has respective first and second support arms that are connected with one another at upper ends of the first and second support arms by way of a respective pivot joint so as to pivot;
    wherein each respective first support arm is connected with the chassis with a lower end of the first support arm, and the second axle is mounted in lower ends of the second support arms of the first and second support elements;
    wherein at least one lifting element for lifting and lowering is arranged on each of the first and second support elements; and
    wherein a change in a pivot angle between the respective first and second support arms lifts or lowers the at least one lifting element.

7. The vehicle according to claim 6, wherein each respective pivot joint is provided with a respective locking device.

8. The vehicle according to claim 6, further comprising
    a respective first support crosspiece fastened on each of the first support arms of the first and second support elements; and
    a respective second support crosspiece fastened on each of the second support arms of the first and second support elements;

wherein the first support crosspiece fastened on the first support arm of the first support element extends toward the second arm of the first support element and the second support crosspiece fastened on the second support arm of the first support element extends toward the first arm of the first support element;

wherein the first support crosspiece fastened on the first support arm of the second support element extends toward the second arm of the second support element and the second support crosspiece fastened on the second support arm of the second support element extends toward the first arm of the second support elements; and wherein the lifting elements comprise a respective lifting element connected with at least one of the first and second support crosspieces.

9. The vehicle according to claim 8, wherein each of the first and second support crosspieces have a respective guide pin extending vertically from a respective free end of each of the first and second support crosspieces, and each lifting element has a respective guide recess at each of first and second ends of the respective lifting element; and wherein the guide pins of the first and second support crosspieces of one side of the chassis engage into the guide recesses of the lifting element.

10. The vehicle according to claim 9, wherein each guide recess extends, at least in certain regions, both in the longitudinal vehicle direction and in the transverse vehicle direction.

11. The vehicle according to claim 8, wherein the first and second support crosspieces of one side of the chassis overlap on a respective end side of the first and second support crosspieces, and at least one support crosspiece end has a slanted region on a side of the at least one support crosspiece end facing another support crosspiece end of the first and second crosspieces.

12. The vehicle according to claim 1, further comprising elements configured so as to telescope in the longitudinal vehicle direction.

13. The vehicle according to claim 12, wherein each of the elements configured to telescope is provided with a respective locking device.

14. The vehicle according to claim 12, wherein the elements configured to telescope are formed by the first and second support crosspieces.

15. The vehicle according to claim 14, wherein the lifting elements comprise first and second lifting elements, wherein the first lifting element is suspended on a first support element and articulated on a first support crosspiece so as to pivot and the second lifting element is suspended on a second support element and articulated on a second support crosspiece so as to pivot.

16. The A vehicle according to claim 1, wherein at least one of the first and second axles is configured as a steering axle.

\* \* \* \* \*